United States Patent Office 2,733,126
Patented Jan. 31, 1956

2,733,126
URANIUM LIBERATION

Louis Spiegler, Woodbury, N. J., assignor to the United States of America as represented by the United States Atomic Energy Commission No Drawing. Application October 20, 1944,
Serial No. 559,667

1 Claim. (Cl. 23—14.5)

This invention relates to the recovery of uranium from uranium-containing mixtures obtained in the production of uranium metal by treatment of a uranium halide with a more active metal, such as sodium, potassium, magnesium or calcium. In such processes there is produced, in addition to the uranium in metallic form, a slag or residue containing uranium, the liberating metal, and impurities, in the form of a mixture of oxides and halides.

It is an object of the present invention to provide a simple and effective process for the separate recovery of uranium, other metals associated with the mixture, and fluorine (as hydrogen fluoride).

The process is especially suitable for the treatment of slags formed by the reaction of uranium tetrafluoride and alkaline earth metals and will be described in relation to its application to such slags. In order to produce a slag of this type a suitable retort provided with means for external heating and lined with lime or burnt dolomite is charged with a mixture of uranium tetrafluoride and magnesium metal in finely divided condition. The retort is then heated externally until the reaction starts. Heat to continue the reaction is supplied by the reaction itself. When the reaction is completed, the uranium metal is separated bodily from the slag, which because of its lighter weight rises to the top of the molten metal during the reaction. The slag contains the free metals, calcium, magnesium, and uranium, and the oxides or fluorides or mixed oxides or fluorides of these metals.

In accordance with the process of the present invention a slag of the above type is crushed, roasted in air, preferably at a temperature between 600° C. and 1000° C., to render the slag more amenable to sulfuric acid treatment, and the roasted slag (in which metallic elements have been converted to chemically combined form, and tetravalent uranium has, in substantial measure, been converted to hexavalent uranium) is ground and then heated to a temperature between 200° and 300° C. with sufficient concentrated sulfuric acid to react with fluorides and expel fluorine as hydrogen fluoride and to react with alkaline earth metals and the uranium compounds to form alkaline earth metal sulfates and uranyl and uranium sulfates. The reactions during roasting and the acid treatment are illustrated as follows ("Me" represents the alkaline earth metal or metals):

Calcining or roasting:
  $2UF_4 + O_2 + 6MeO \rightarrow 4MeF_2 + 2MeUO_4$
  $2U + 3O_2 + MeO \rightarrow MeU_2O_7$
  $2Me + O_2 \rightarrow 2MeO$ Acid treatment:
  $MeF_2 + H_2SO_4 \rightarrow MeSO_4 + 2HF$
  $MeO + H_2SO_4 \rightarrow MeSO_4 + H_2O$
  $UO_3 + H_2SO_4 \rightarrow UO_2SO_4 + H_2O$
  $UO_2 + 2H_2SO_4 \rightarrow U(SO_4)_2 + 2H_2O$
  $MeU_2O_7 + 3H_2SO_4 \rightarrow MeSO_4 + 2UO_2SO_4 + 3H_2O$
  $MeUO_4 + 2H_2SO_4 \rightarrow MeSO_4 + UO_2SO_4 + 2H_2O$ The heating period required for the roasting step will normally depend upon the initial composition and particle size of the slag, the quantity of air passing through the kiln, and the rate of rotation and size of the kiln. Thus a period of four hours may be suitable for many installations whereas with greater air flow or finer particle size one-half or one-quarter of this period may be adequate, and with slower rotation or a smaller kiln, a period two or three times as long may be most effective. The completely roasted slag will weigh about 4% more than the raw material as a result of addition of oxygen to free metals and metal compounds.

Hydrogen fluoride evolved during the sulfuric acid treatment may be recovered by collecting evolved gases and condensing the hydrogen fluoride either at ordinary or elevated pressure and at appropriately low temperatures. The solid product is comparatively free of fluorine and normally will contain substantially less than 1% fluorine (as fluorides). Depending upon the efficiency of the roasting and sulfuric acid treatments, the proportion of uranium present in the form of uranyl sulfate may constitute from a major part to substantially all of the uranium present.

I prefer to carry out the sulfuric acid treatment with a quantity of sulfuric acid limited so that the uranyl sulfate remains undissolved and substantially no separate liquid phase is present at the end of the reaction. By digesting the product with sufficient water to dissolve uranium as uranyl sulfate and adding sufficient of an oxidizing agent (such as air, nitric acid or a permanganate, chromate or peroxide) to convert the remaining small proportion of uranium sulfate to uranyl sulfate, neutralizing residual sulfuric acid present by means of alkali-metal or alkaline earth metal hydroxide or carbonate to a pH between 2 and 5, preferably between 3½ and 4, and separating solids from the resulting mixture, a uranyl sulfate solution is produced containing exceedingly small amounts of calcium and fluorine, normally not more than 0.3% fluorine, 0.15% calcium and 0.001% iron. With thorough $H_2SO_4$ treatment, careful pH control to at least 3.7, maintenance of the solution between 70° and 100° C. long enough to complete the precipitation of iron (about one to four hours), and complete separation of solids, a solution containing substantially smaller quantites of these materials may be obtained.

The uranium may be recovered from such a solution in any suitable manner depending upon the nature of the active metals present in the solution and the nature of the uranium product desired. Thus the uranium may be precipitated from alkaline solutions as sodium uranate or from acid solutions as uranium carbonate or uranium peroxide. The solutions prepared by the process of the present invention are particularly suitable for use in the uranium peroxide recovery process of my U. S. Patent application Serial No. 559,665 entitled "Separation of Uranium from Mixtures," filed October 20, 1944.

The following example will serve to illustrate the recovery process of the present invention:

Example

From the manufacture of metallic uranium from uranium tetrafluoride, there remains a slag of the following approximate composition:

|  | Percent |
|---|---|
| Fluorine | 44 |
| Magnesium | 29 |
| Uranium | 21 |
| Calcium | 4 |
| Oxygen | 2 |

100 parts by weight of the slag are crushed in a jaw crusher to reduce it to ½ inch and smaller lumps and the crushed material is roasted in contact with air in a rotary kiln externally heated to an internal temperature between 700° and 800° C. for four hours.

The roasted slag is cooled and ground in a conventional roller mill to a particle size passing through a 200 mesh screen.

The ground roasted slag is then mixed with about 300 parts by weight of 98% $H_2SO_4$ (commercial concentrated sulfuric acid) and the mixture is passed into an externally heated retort provided with a mixing device, and is heated therein to an internal temperature of about 250° C. until hydrogen fluoride is no longer evolved. The solid sludge produced in this manner is substantially free from fluorine and contains all of the uranium in acid-soluble form, mainly uranyl sulfate with a small proportion, on the order of 10%, present as the tetravalent uranium sulfate.

The sulfate sludge is thoroughly mixed with about 500 parts by weight of water. The solution is green, indicating the presence of tetravalent uranium sulfate, and air is bubbled through the solution to effect simultaneous agitation and oxidation of the tetravalent uranium to uranyl sulfate.

To convert the last remnants of uranium sulfate to uranyl sulfate a small quantity of hydrogen peroxide is added, sufficient to render the solution yellow.

In order to remove calcium and small amounts of iron which may be present the following treatment is applied:

The aqueous mixture is heated to 90°–95° C. This heating step decomposes any insoluble uranium peroxide, causing it to be converted to the soluble uranyl sulfate. The free acid in the solution is next neutralized to a pH of about 3.7 by adding calcium carbonate. The mixture is heated at 95°–100° C. until at test sample of the clear liquid heated ¼ hour longer at constant volume gives no iron precipitate.

The solution is separated from solids by filtration, cooled to 40° C. or below and any additional precipitate filtered off.

The solution of uranyl sulfate prepared by the above process is especially suitable for the production of uranium peroxide by the process of my U. S. patent application, Serial No. 559,665. In application of the uranium peroxide isolation process to mixtures containing magnesium the insoluble peroxide is separated from a magnesium sulfate solution. When fluorine is present in substantial concentrations, magnesium fluoride may be precipitated along with the peroxide. Hence the product becomes contaminated not only with fluorine but with magnesium as well. By producing a product of very low fluorine content, the process of the present invention provides solutions from which the uranium can be recovered substantially free from magnesium as well as from fluorine.

It will be understood that I intend to include variations and modifications of the invention and that the preceding example is an illustration only and in no wise to be construed as a limitation upon the invention, the scope of which is defined in the appended claim, wherein I claim:

The method of obtaining a uranyl sulfate solution substantially free from fluoride ions from a slag formed in the production of metallic uranium by the reduction of uranium tetrafluoride with metallic magnesium in a retort lined with a material selected from the group consisting of lime and burnt dolomite, which slag contains free alkaline earth metal and uranium and also oxides and fluorides of said metals which comprises crushing said slag, roasting the crushed slag in air at a temperature between 600° C. and 1000° C. to oxidize the free metal in the slag and to convert some of the tetravalent uranium to a hexavalent state, grinding the roasted product, mixing the ground roasted product with a quantity of concentrated sulfuric acid which is at least sufficient to convert all fluorides present therein to hydrogen fluoride and all metallic oxides present therein to the corresponding metallic sulfates, said quantity of sulfuric acid being limited so that it does not dissolve the sulfates produced and form a separate liquid phase, heating said mixture of ground roasted product and concentrated sulfuric acid at a temperature between 200° C. and 300° C. until hydrogen fluoride is no longer evolved and substantially all fluorides in said mixture have been converted to sulfates, digesting the sulfated product in water to dissolve the uranium sulfates contained therein, treating said solution containing uranium sulfates with an oxidizing agent to complete the conversion of tetravalent uranium to the hexavalent state as uranyl sulfate, neutralizing residual sulfuric acid present to adjust the pH of the solution to between 2 and 5, and separating the resulting uranyl sulfate solution from undissolved solids.

References Cited in the file of this patent
UNITED STATES PATENTS

| Number | Name | Date |
|---|---|---|
| 1,286,400 | Pellegrin | Dec. 3, 1918 |
| 2,180,692 | Potter | Nov. 21, 1939 |

FOREIGN PATENTS

| Number | Country | Date |
|---|---|---|
| 16,228 | Great Britain | of 1915 |

OTHER REFERENCES

Mellor: "Inorganic and Theoretical Chemistry," vol. 12, pages 49–74, Longmans, Green & Co., London (1932).